(12) United States Patent
Greenberg (10) Patent No.: US 9,630,197 B1
(45) Date of Patent: Apr. 25, 2017

(54) DYNAMIC POWDER DISPERSING SYSTEM (71) Applicant: Troy Greenberg, South Beloit, IL (US)

(72) Inventor: Troy Greenberg, South Beloit, IL (US)

( * ) Notice: Subject to any disclaimer, the term of this patent is extended or adjusted under 35 U.S.C. 154(b) by 0 days.

(21) Appl. No.: 15/063,921

(22) Filed: Mar. 8, 2016

(51) Int. Cl.
B05C 19/00 (2006.01)
B05C 19/06 (2006.01)
B05B 12/02 (2006.01)
B05B 7/14 (2006.01)
B05B 12/12 (2006.01)
B05C 11/10 (2006.01)
G05B 19/05 (2006.01)
G05B 19/042 (2006.01)
G05B 19/00 (2006.01)

(52) U.S. Cl.
CPC ............ *B05B 12/02* (2013.01); *B05B 7/1404* (2013.01); *B05B 12/12* (2013.01); *B05B 12/122* (2013.01); *B05C 11/10* (2013.01); *B05C 11/1018* (2013.01); *B05C 11/1021* (2013.01); *B05C 19/00* (2013.01); *B05C 19/06* (2013.01); *G05B 19/00* (2013.01); *G05B 19/042* (2013.01); *G05B 19/05* (2013.01)

(58) Field of Classification Search
CPC ....... B05B 12/02; B05B 12/12; B05B 12/122; B05B 7/1404; B05C 19/00; B05C 19/06; B05C 11/1021; B05C 11/1018; B05C 11/10; G05B 19/042; G05B 19/00; G05B 19/05
USPC ............... 118/308, 696, 668, 676, 679, 712; 700/66, 231–244; 427/8
See application file for complete search history.

(56) References Cited

U.S. PATENT DOCUMENTS

| 2,560,356 A | 7/1951 | Liedholm |
| 4,180,844 A | 12/1979 | Peck |
| 4,359,192 A | 11/1982 | Takahashi et al. |
| 4,863,316 A | 9/1989 | Gianella et al. |
| 4,974,646 A | 12/1990 | Martin et al. |

(Continued)

FOREIGN PATENT DOCUMENTS

| EP | 1424142 A1 | 6/2004 |
| EP | 0942050 B1 | 1/2006 |

(Continued)

OTHER PUBLICATIONS

Pawlowski, Lech, The Science and Engineering of Thermal Spray Coatings, 2008, Second Edition, John Wiley & Sons, Ltd: West Sussex, England.

(Continued)

*Primary Examiner* — Laura Edwards
(74) *Attorney, Agent, or Firm* — Craige Thompson; Thompson Patent Law (57) ABSTRACT Apparatus and associated methods relate to dynamically generating commands to manage the flow rate of a powder as a function of time in response to arbitrarily shaped target parts traveling along a conveyor. In an illustrative example, a controller may receive shape information about each target part as the part travels along the conveyor. The controller may dynamically generate commands to a pump to control the flow rate of powder to a reciprocating nozzle. In some embodiments, the controller may generate motion trajectory commands to the reciprocating nozzle to deliver a predetermined amount of powder to the target part as the target part travels along the conveyor.

20 Claims, 9 Drawing Sheets (56) References Cited

U.S. PATENT DOCUMENTS

| | | | |
|---|---|---|---|
| 5,387,442 A | 2/1995 | Kroeger et al. |
| 5,454,271 A | 10/1995 | Yamamoto et al. |
| 5,487,624 A | 1/1996 | Toyota et al. |
| 5,721,052 A | 2/1998 | Muthiah et al. |
| 5,739,429 A | 4/1998 | Schmitkons et al. |
| 6,077,610 A | 6/2000 | Correll et al. |
| 6,146,710 A | 11/2000 | Symons |
| 6,176,647 B1 | 1/2001 | Itoh |
| 6,218,483 B1 | 4/2001 | Muthiah et al. |
| 6,239,234 B1 | 5/2001 | Tsubuku |
| 6,270,853 B1 | 8/2001 | Brown et al. |
| 6,296,939 B1 | 10/2001 | Kunze et al. |
| 6,361,605 B1 | 3/2002 | Shutic et al. |
| 6,433,099 B1 | 8/2002 | Nicholl et al. |
| 6,458,250 B1 | 10/2002 | Holliday et al. |
| 6,548,109 B1 | 4/2003 | Hagquist et al. |
| 6,977,013 B2 | 12/2005 | Schroeder et al. |
| 7,364,795 B2 | 4/2008 | Daly et al. |
| 7,998,571 B2 | 8/2011 | Lyons et al. |
| 2005/0136277 A1 | 6/2005 | Daly et al. |
| 2005/0238794 A1* | 10/2005 | Yang ............... B05B 13/0242 427/8 |
| 2006/0099334 A1* | 5/2006 | O'Brien ............ C03C 17/002 427/163.1 |
| 2013/0071578 A1 | 3/2013 | Martin et al. |

FOREIGN PATENT DOCUMENTS

| EP | 1550513 B1 | 8/2008 |
| JP | 2005334754 A * | 12/2005 |

OTHER PUBLICATIONS

PCI, Powder Coating Makes It Possible [online]. Taylor Mill, KY: The Powder Coating Institute [retrieved on Dec. 13, 2015]. Retrieved from: http://www.powdercoating.org.

Nordson Corporation, Smart-Coat Controller, Dec. 1995, Nordson Corporation: Amherst, OH.

* cited by examiner

DYNAMIC POWDER DISPERSING SYSTEM

TECHNICAL FIELD

Various embodiments relate generally to operations for powder coating materials.

BACKGROUND

Powder coating is commonly used for coating surfaces to create a tougher finish. Powder coating is normally used for metals found in common appliances, such as, for example, toasters, water heaters, washers and dryers. Powder coating also provides a decorative aspect. For example, powder coated color-durable finishes may be applied to wheel rims or accent parts to enhance the aesthetic appeal of a vehicle.

Powder coating involves dispensing a powder in a specific area to electrostatically adhere to the surface of a part. The powder coating process typically involves a series of steps including part preparation, powder coat application and curing. The powder may be charged to improve adherence to the targeted part.

Powder coated parts display superior consistency and uniformity over the finishes of traditional liquid-based coats. This superior consistency and uniformity provide tough, durable, films that enhance the durability of the finish by increasing resistance to peeling and cracking. In addition, powder coating releases virtually no volatile organic compounds during application.

SUMMARY

Apparatus and associated methods relate to dynamically generating commands to manage the flow rate of a powder as a function of time in response to arbitrarily shaped target parts traveling along a conveyor. In an illustrative example, a controller may receive shape information about each target part as the part travels along the conveyor. The controller may dynamically generate commands to a pump to control the flow rate of powder to a reciprocating nozzle. In some embodiments, the controller may generate motion trajectory commands to the reciprocating nozzle to deliver a predetermined amount of powder to the target part as the target part travels along the conveyor.

Various embodiments may achieve one or more advantages. For example, the dynamic generation of commands to the pump may increase throughput of a manufacturing line for powder coating parts. The dynamic generation of commands may provide for continuous flow of arbitrarily shaped wood parts such that the powder coating process may be more accurate by reducing the effects of having too much or too little powder.

In some embodiments, additional sensors. The additional sensors may provide various types of information, for example, environmental temperature, and humidity. The controller may generate modified commands to the pump or the reciprocating nozzle in response to the additional information. In some embodiments, the controller may generate commands to manage the speed of the conveyor based on information received from the sensors. In various embodiments, an operator may input information to the controller.

In some embodiments, different types of parts may be powder-coated on the same conveyor cycle. For example, a wood part may be followed by a metal part. The controller may dynamically alter the setting for the flow rate and the reciprocating nozzle to accommodate the different types of parts as the parts travel along the conveyor belt. In some embodiments, the controller may alter the conveyor speed to accommodate different types of parts on the same conveyor cycle.

Some embodiments may include a network interface. The network interface may be used to communicate detected sensor information and operator-inputted information to a remote database. The remote database may store the received information to generate a database of commands based on historical information. The remote database may be a centralized database. The centralized database may contain information for various powder coating systems located at different locations. The centralized database may reduce costs and provide for improved algorithms for operating multiple powder coating systems.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
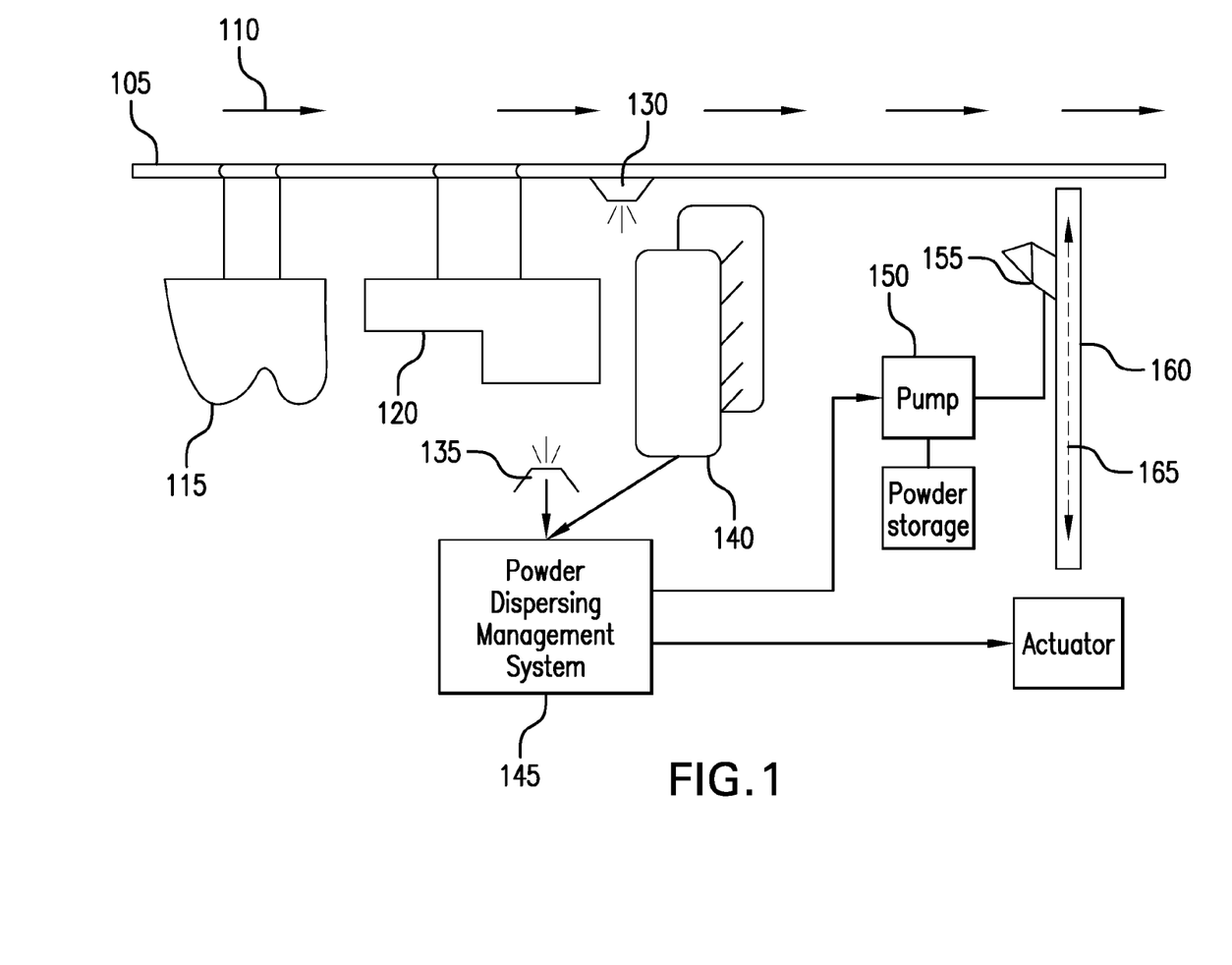
FIG. 1 depicts a perspective view of a powder coating operations with an exemplary dynamic powder dispersing system.

FIG. 1 depicts a perspective view of a powder coating operations with an exemplary dynamic powder dispersing system. A conveyor 105 travels along a path of travel 110. As depicted, the conveyor 105 transports two target parts 115, 120 along the path of travel 110. A sensor 140 detects shape information for the target parts 115, 1120. The detected shape information is received by a powder dispersing management system 145 (PDMS). In response to the received shape information, the PDMS 145 generates dispersing powder commands to operate a pump 150 to provide powder to a nozzle 155 to disperse a predetermined amount of powder to the target parts 115, 120 as the target part 115, 120 travels along the conveyor 105.

A sensor 130 is located along the conveyor 105. The sensor 130 may scan the top portions of the target parts 115, 120 as the parts travel along the conveyor 105. A sensor 135 is located opposite of the conveyor 105. The sensor 135 may scan the bottom portions of the target parts 115, 120 as the parts travel along the conveyor 105. In some embodiments, the sensors 130, 135 may detect environmental conditions.

For example, the sensors 130, 135 may measure humidity, barometric pressure, or temperature.

The sensor 140 is located orthogonal to the path of travel 110. The sensor 140, as depicted, is a light curtain to measure the size of the target parts 115, 120. The sensor 140 transmits the measured size of the target parts 115, 120 to a powder dispersing management system 145 (PDMS). The PDMS 145, in response to the received target parts 115, 120 sizes, generates a powder disperse command and a nozzle motion trajectory command. A powder flow controller 150 receives the powder disperse command from the PDMS 145. The powder controller regulates a powder flow, based on the received powder disperse command, to supply powder to the nozzle 155.

An actuator 160 receives the nozzle motion trajectory command. The actuator 160 is operably coupled to the nozzle 155 such that the actuator 160 is disposed orthogonal to the path of travel 110 to create a linear path of travel 165 such that the nozzle 155 travels along the linear path of travel 165 in response to the received nozzle motion trajectory command.

In some embodiments, the sensor 140 may be a light screen. In various embodiments, the sensor 140 may be laser break beam sensor. A proximity sensor may be included near the nozzle 155 to detect the target when at a certain proximity to the nozzle 155. In some embodiments, the sensor 140 may be a 3D image sensor.

Figure 2:
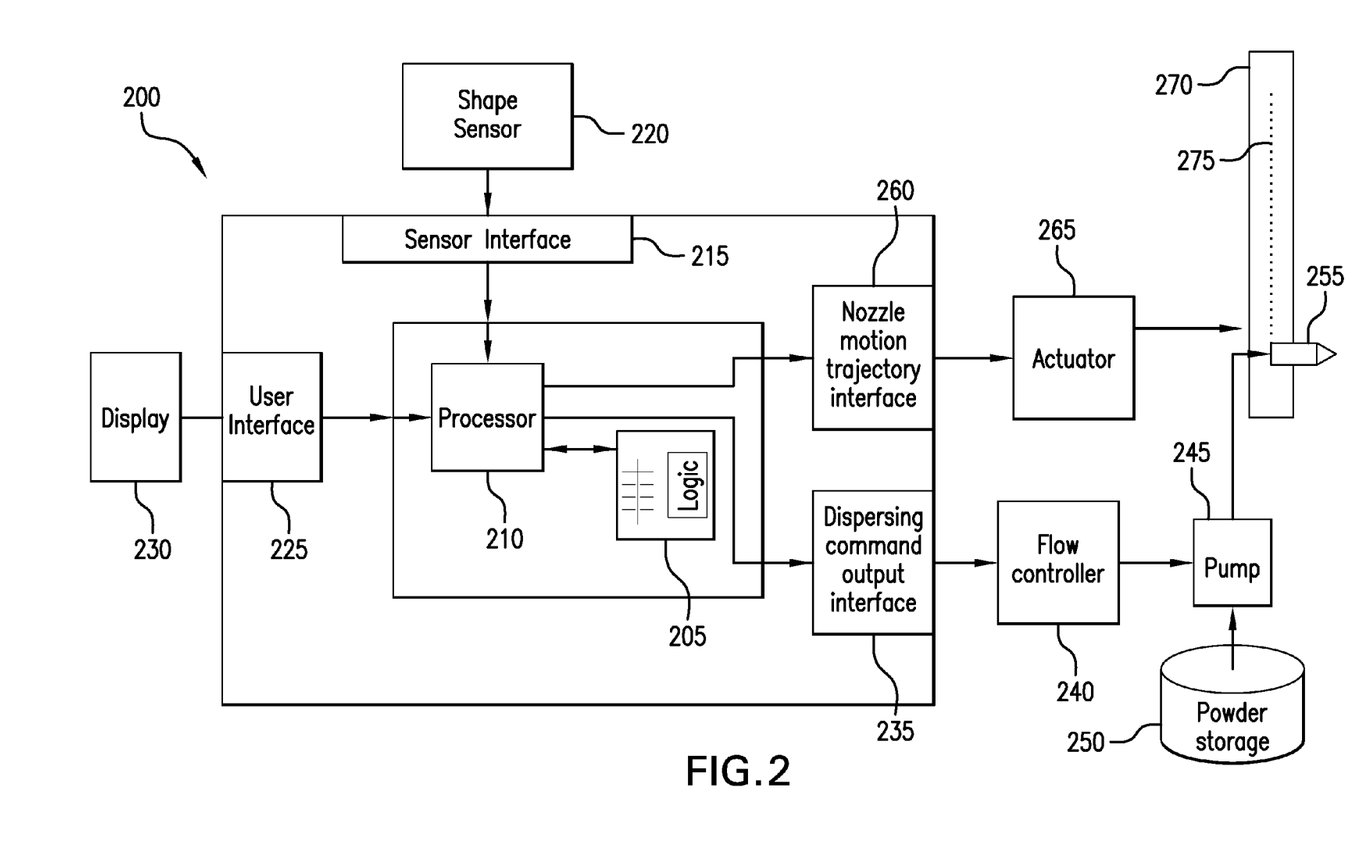
FIG. 2 depicts a schematic view of a dynamic powder dispersing system.

FIG. 2 depicts a schematic view of a dynamic powder dispersing system. As depicted, the PDMS 200 includes a memory component 205 in two-way communication with a processor 210. The processor 210 receives, from a sensor interface 215, a size of a target part, such as, for example, the target parts 115, 120, as measured by a shape sensor 220. The processor 210 may also receive user inputted information via a user interface 225. As depicted, the user interface 225 is connected to display screen (e.g., LCD) 230 having touch controls for a user to input information for the processor 210.

Upon the processor 210 receiving the size information from the sensor interface 215 and receiving any user input information from the user interface 225, the processor 210 executes a set of instructions (logic) stored in the memory component 205 to generate a powder dispersing command and a nozzle motion trajectory command, both the powder dispersing command and the nozzle motion trajectory command based on the received size information about the target parts 115, 120. The memory component 205 may include look-up tables (LUTs) that store predetermined powder dispersing commands and nozzle motion trajectory commands. In some embodiments, the memory component 205 may include logic to generate the powder dispersing commands and the nozzle motion trajectory commands based on various types of information. For example, the memory component 205 may include logic for execution by the processor 210 to generate the nozzle motion trajectory commands based on the received size of the target part 115 and the velocity of the target part 115 as it moves long the conveyor. The velocity of the target part 115 may be input by a user via the LCD 230. In some embodiments, the logic may include a set of instructions for generating the powder dispersing commands and the nozzle motion trajectory commands based of various factors, such as, for example, humidity and barometric pressure.

The processor 210 transmits the generated powder dispersing commands to a disperse command output interface 235. The disperse command output interface 235 transmits the generated powder dispersing commands to a flow rate controller 240. A flow rate regulator pump 245 receives, from the flow rate controller 240, the generated powder dispersing commands such that the flow rate regulator pump 245 transfers powder from a powder storage compartment 250 to a nozzle 255 at a predetermined flow rate. The predetermined flow rate, for example, may be generated from a LUT based on the received shape information. As depicted, the predetermined flow rate includes a powder dispersing command and the nozzle motion trajectory command.

In some embodiments, the flow rate regulator pump 245 may be a venturi pump. In some embodiments, the flow rate regulator pump 245 may be a high-density low volume pump or an auger pump. In various embodiments, multiple regulator pumps 245 may provide powder to multiple nozzles 255. In a multiple regulator pump 245 configuration, the regulator pumps 245 may be different. For example, a first pump may be a venturi pump and a second pump may be an auger pump.

The processor 210 transmits the generated nozzle motion trajectory commands to the actuator controller 265 via the nozzle motion trajectory interface 260. The actuator controller 265 is operably connected to a reciprocating actuator 270. As depicted, the actuator controller 265, based on the received generated nozzle motion trajectory, causes the reciprocating actuator 270 to travel along a substantially linear track 275. The nozzle 255 is connected to the reciprocating actuator 270 such that when the actuator controller 265 causes the reciprocating actuator 270 to travel along the substantially linear track 275, the nozzle 255 is displaced accordingly along the substantially linear track 275. In an exemplary embodiment, the nozzle 255 is displaced along the substantially linear track 275 in accordance with the generated nozzle motion trajectory commands such that, for example, the nozzle 255 is at a position relative to the target part 115 to deliver a predetermined amount of powder to a portion of the target part 115 passes the nozzle 255 along the travel path of the conveyor 105.

In some embodiments, the target parts 115, 120 may be constructed of the same material composition. For example, the target parts 115, 120 may be wood parts. In another embodiment, the target parts 115, 120 may be metal parts. In various embodiments, the target part 115 may be medium-density fiberboard (MDF) and the target part 120 may be aluminum. The composition of the target parts 115, 120 may introduce different sensors to detect new information about the target parts. For example, the powder-coating of wood traditionally requires that a wood part be pre-heated for the powder to adhere to the wood part. The processor 210 may receive information from a sensor configured to detect the surface temperature of the wood part. The processor 210 may generate powder dispersing commands and nozzle motion trajectory commands in response to the received temperature of the wood part.

Figure 3:
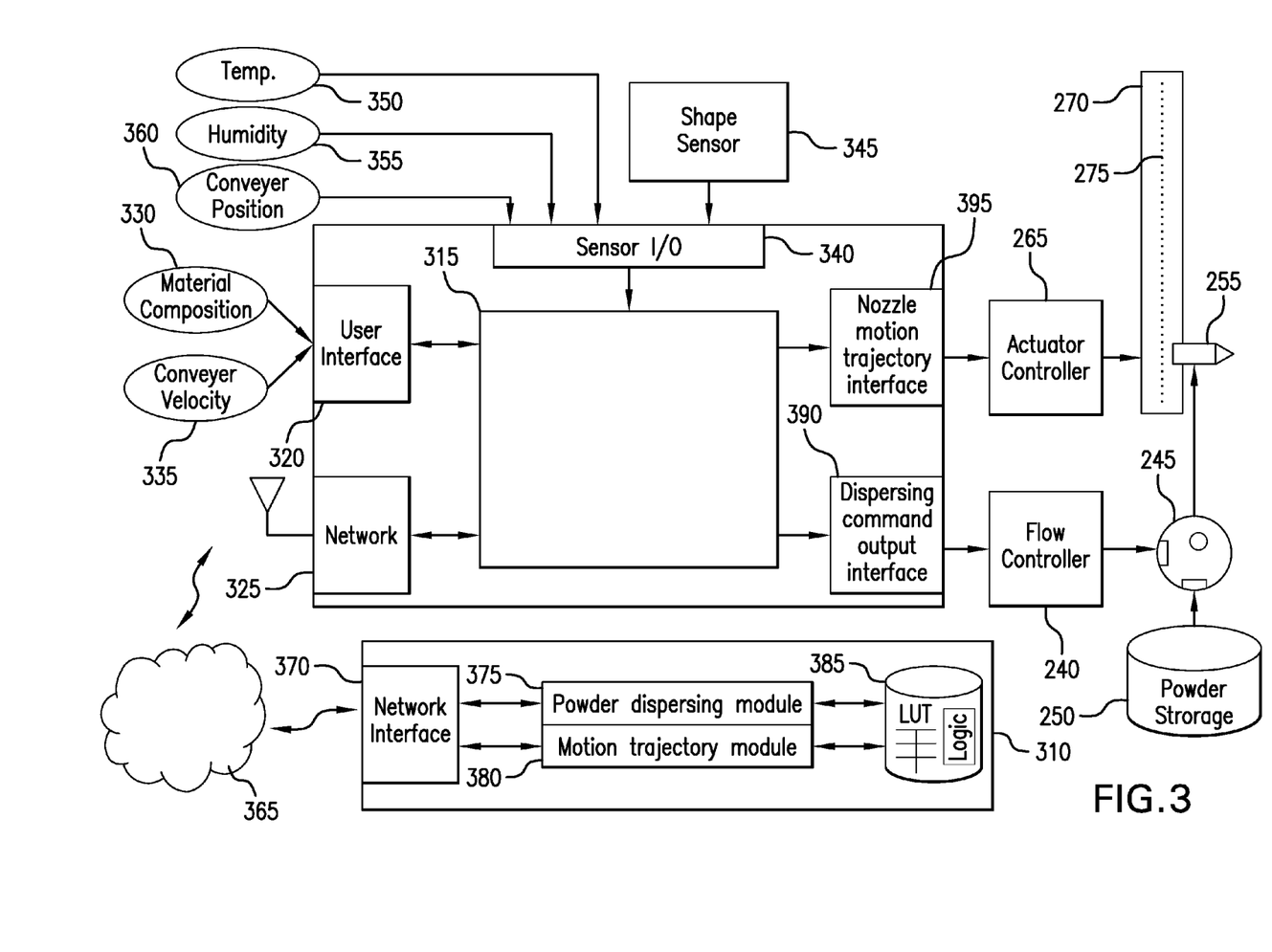
FIG. 3 depicts a schematic view of a dynamic powder dispersing system with networking capabilities.

FIG. 3 depicts a schematic view of a dynamic powder dispersing system with networking capabilities. As depicted, the PDMS 300 includes a local component 305 and a network component 310. The local component 305 includes a processor 315 in two-way communication with a user interface 320. As depicted, the user interface 320 receives and transmits to the processor 315 information about the material composition 330 of a target part and the conveyor velocity 335. In some embodiments, other factors, such as, for example, the type of the powder may be received by the user interface 320. For example, a powder may be made out of epoxy, polyester, acrylic, or fluoropolymer.

The processor 315 connects to a sensor interface 340. The sensor interface 340 is configured to receive size information about a target part from the shape sensor 345. As depicted, the sensor interface 340 is connected to a temperature sensor 350, a humidity sensor 355, and sensor 360 to determine the position of the conveyor belt. In some embodiments, the PDMS 300 may include different sensors to measure different factors, such as, for example, a sensor to measure a dew point temperature.

The processor 315 is in two-way communication with a network interface 325. As depicted, the network interface 325 transmits and receives, through an internet connection link 365, information to and from the network component 310. The network component 310 includes a network interface 370 that is in two-way communication with the network interface 325 through the internet connection link 365. For example, the network module 370 may receive information from the shape sensor 345, the temperature sensor 350, the humidity sensor 355, or the sensor 360 to generate powder dispersing commands and nozzle motion trajectory commands. As depicted, the network interface 370 transmits the received information to a powder dispersing module 375 and a motion trajectory module 380. The powder dispersing module 375 generates powder dispersing commands in accordance to a LUT stored in a memory component 385. The motion trajectory module 380 generates nozzle motion trajectory commands in accordance with logic stored in the memory component 385. In some embodiments, both the powder dispersing commands and the nozzle motion trajectory commands may be generated from the LUT. In some embodiments, both the powder dispersing commands and the nozzle motion trajectory commands may be generated from logic stored in the memory component 385.

The network interface 370, via the internet communication link 365, transmits the generated powder dispersing commands and the generated nozzle motion trajectory commands to the network interface 325. The processor 305 transmits the generated powder dispersing commands to a disperse command output interface 390. The disperse command output interface 390 transmits the generated powder dispersing commands to a flow rate controller 240. A flow rate regulator pump 245 receives, from the flow rate controller 240, the generated powder dispersing commands such that the flow rate regulator pump 245 transfers powder from a powder storage compartment 250 to a nozzle 255 at a predetermined flow rate.

The processor 305 transmits the generated nozzle motion trajectory commands to the actuator controller 265 via the nozzle motion trajectory interface 395. The actuator controller 265 is operably connected to the reciprocating actuator 270. The actuator controller 265, based on the received generated nozzle motion trajectory, causes the reciprocating actuator 270 to travel along a substantially linear track 275. The nozzle 255 is connected to the reciprocating actuator 270 such that when the actuator controller 265 causes the reciprocating actuator 270 to travel along the substantially linear track 275, the nozzle 255 is displaced accordingly along the substantially linear track 275.

In some embodiments, the disperse command output interface 390 and the nozzle motion trajectory interface 395 may be a single output interface. In various embodiments, the nozzle motion trajectory commands may include commands for multiple reciprocating actuators. The actuator controller 265 may be operably connected to the multiple reciprocating actuators and transmits the nozzle motion trajectory commands to the multiple reciprocating actuators. In some embodiments, each reciprocating actuator of the multiple of reciprocating actuators may be operably connected a single actuator controller. In some embodiments, the reciprocating actuators may be linear screw-type actuators. In various embodiments, the reciprocating actuators may be hydraulic or pneumatic.

In some embodiments, the sensor information from the shape sensor 345, the temperature sensor 350, the humidity sensor 355, or the sensor 360 transmitted via the internet communication link 365 to the network interface 370 may be stored in the memory component 385 of the network component 310. The sensor information may be stored in a database on the network component 310 to create a centralized database. The centralized database may be accessed by multiple local components similar to local component 305. Each local component accessing the centralized database via the network component 310 may include different sensors or different combinations of the sensors.

Figure 4:
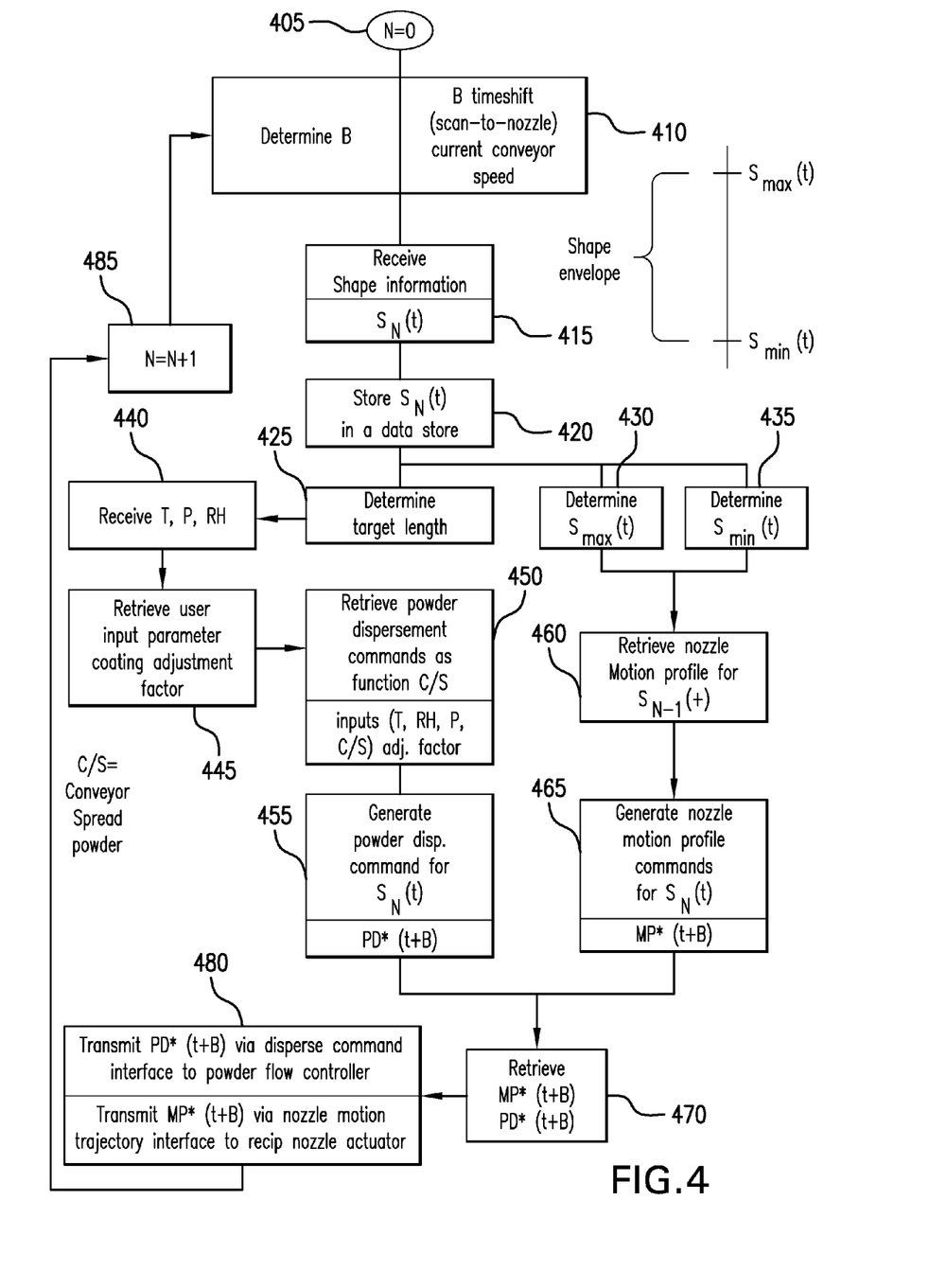
FIG. 4 depicts a flowchart of an exemplary method of generating powder dispersing commands and motion trajectory commands.

FIG. 4 depicts a flowchart of an exemplary method of generating powder dispersing commands and motion trajectory commands. In the FIG. 4 embodiment, a method 400 of generating powder dispersing commands and motion trajectory commands is depicted. The method 400 is depicted from the perspective of the processor 210. The method begins, at 405, as a value of zero is assigned to an N variable. The processor then determines a time shift ($\beta$) reflective of a current speed of the conveyor 105, at 410. The time shift ($\beta$) of method 400 may be defined as the time from which a first portion of a target part is scanned by a sensor until the first portion of the target part aligns with a nozzle. In various embodiments, the time shift ($\beta$) may be defined differently, such as, for example, the conveyor may operate at varying speeds introducing a new factor as to the calculation of the time shift.

At 415, the processor 210 receives shape information about a target part from a shape sensor. The processor 210 receives the shape information as a function of time ($Sn(t)$) for the portion of a target part that is being scanned. The processor 210, at 420, stores the shape information in a data store. In some embodiments, the data store may be the memory component 205 to store the shape information locally. In some embodiments, the data store may be the memory component 385 of the network component 310 to store the shape information remotely. Using the shape information received at 420, the processor 210 determines a length of a target part, at 425. The processor 210, at 430, determines $Smax(t)$. At 435, the processor 210 determines $Smin(t)$.

At 440, the processor 210 receives different values of environmental variables. For example, as depicted, the temperature, relative humidity, and position of a conveyor are received. In some embodiments, various environmental variables, such as, for example, atmospheric pressure, may be received. At 445, the processor 210 retrieves user input parameters. As depicted, the processor 210 retrieves the speed the conveyor is traveling and an adjustment factor from a user interface. The processor 210 retrieves powder dispersing commands as a function of inputs. For example, as depicted, the powder dispersing commands are a function of the received temperature, the received relative humidity, the received conveyor position, the retrieved conveyor speed and the retrieved adjustment factor. At 455, the processor 210 generates a powder dispersing command for $Sn(t)$. The powder dispersing command ($PD*(t+\beta)$) is a function of time plus the time shift ($\beta$). At 460, the processor 210 retrieves a nozzle motion trajectory profile for $Sn-1(t)$. The processor 210, at 465, generates a nozzle motion trajectory command ($MP*(t+\beta)$) for $Sn(t)$.

At 470, the processor 210 retrieves the powder dispersing command (PD*(t+β)) and the nozzle motion trajectory command (MP*(t+β)) to generate, at 475, a nozzle temporal profile comprising of a coordinated set of the powder dispersing command (PD*(t+β)) and the nozzle motion trajectory command (MP*(t+β)). At 480, the processor 210 transmits the powder dispersing command (PD*(t+β)) via a disperse command output interface and transmits the nozzle motion trajectory command (MP*(t+β)) via a nozzle motion trajectory interface. At 485, a value of one is added to the N variable before processor 210 repeats the method 400 starting at 410.

In some embodiments, step 440 may be bypassed if no environmental values are available to be received. In various embodiments, the initial adjustment factor retrieved, at 445, may be used in repeated cycles of the method 400 when no new adjustment factor is presented.

Figure 5:
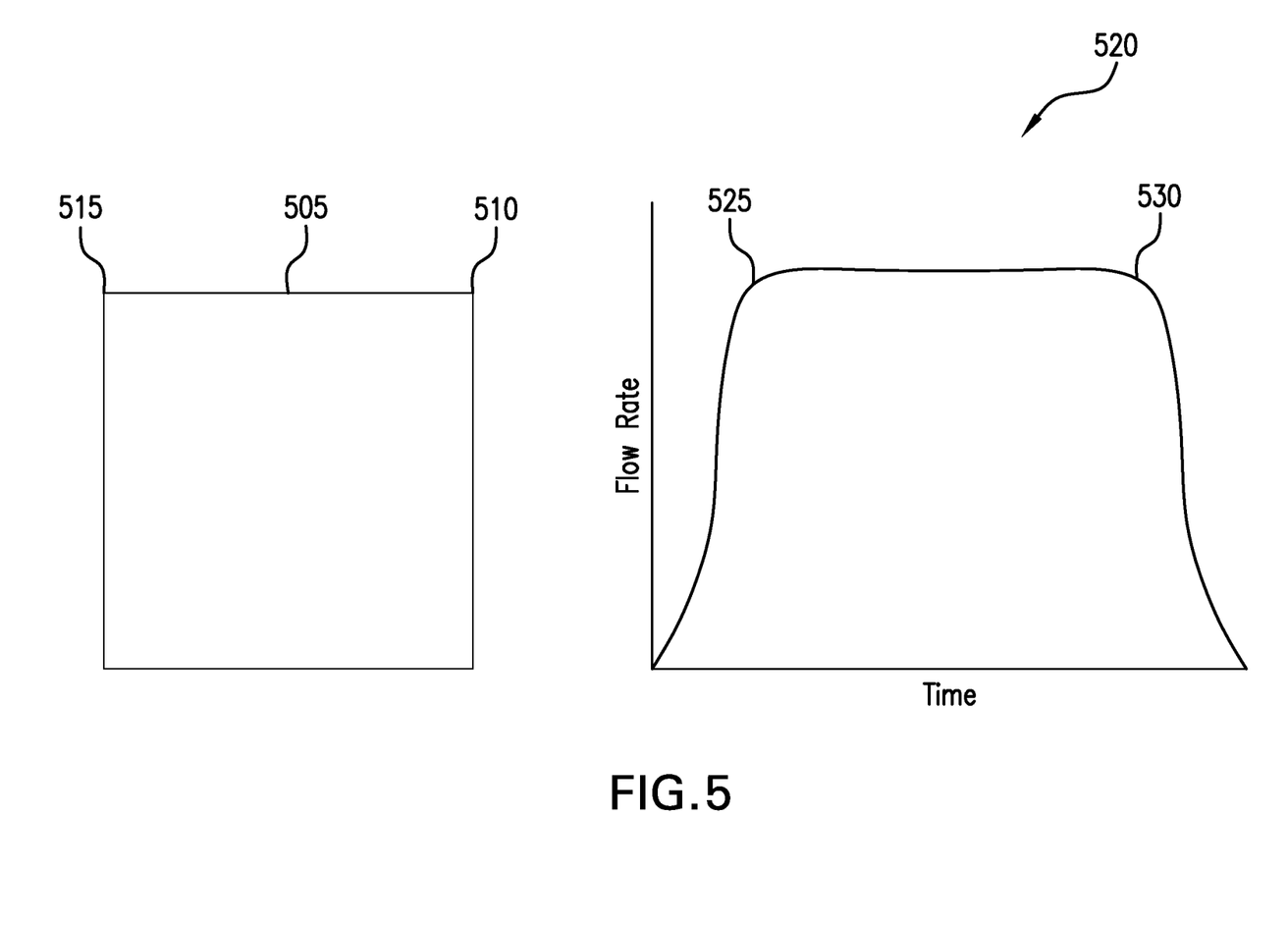
FIG. 5 depicts a square target part and a corresponding exemplary flow rate vs. time graph.

FIG. 5 depicts a square target part and a corresponding exemplary flow rate vs. time graph. As depicted in FIG. 5, a target part 505 is in the shape of a square. A graph 520 depicts the flow rate as a function of time (f(t)) that corresponds to the target part 505 as the target part 505 travels through a spray zone located along the path of travel 110 of the conveyor 105. The spray zone may be defined as an area along the path of travel 110 where the nozzle 155 disperses powder. In some embodiments, the spray zone area may be larger due to multiple nozzles along the path of travel 110. In some embodiments, different spray zone areas may be located along the path of travel 110.

The target part 505 includes a pair of edges 510, 515. The flow rate increases as the first edge 510 enters the spray zone as illustrated at 525 on the graph 520. As depicted, a flow rate remains fairly constant until the flow rate decreases as the second edge 515 passes through the spray zone as illustrated at 530 of the graph 520.

Figure 6:
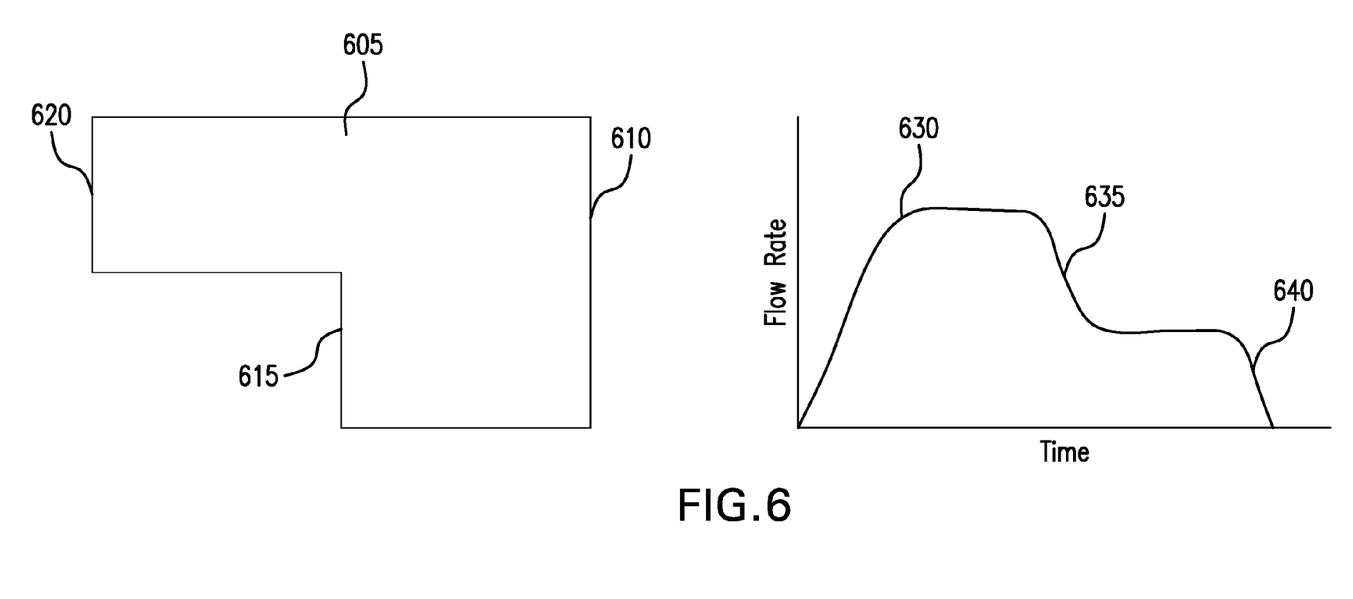
FIG. 6 depicts an L-shaped target part and a corresponding exemplary flow rate vs. time graph.

FIG. 6 depicts an L-shaped target part and a corresponding exemplary flow rate vs. time graph. A target part 605 is L-shaped. A graph 625 depicts the flow rate as a function of time (f(t)) that corresponds to the target part 605 as the target part 605 travels through a spray zone located along the path of travel 110 of the conveyor 105. The target part 605 includes a first edge 610, a second edge 615, and a third edge 620. The first edge 610 and the second edge 615 define a first section of the target part 605. At the second edge 615, the part extends to the third edge 620 to form a second section of the target part 605. As depicted the first edge 610 is longer than the third edge 620.

In the depicted embodiment, the graph 625 illustrates an increase in the flow rate, at 630, to correspond to the first edge 610 entering a spray zone. The flow rate remains constant until the second edge 615 enters the spray zone prompting a decrease in the flow rate as illustrated at 635. The flow rate will remain constant again until the third edge 620 passes through the spray zone prompting a decrease in the flow rate, as depicted at 640.

Figure 7:
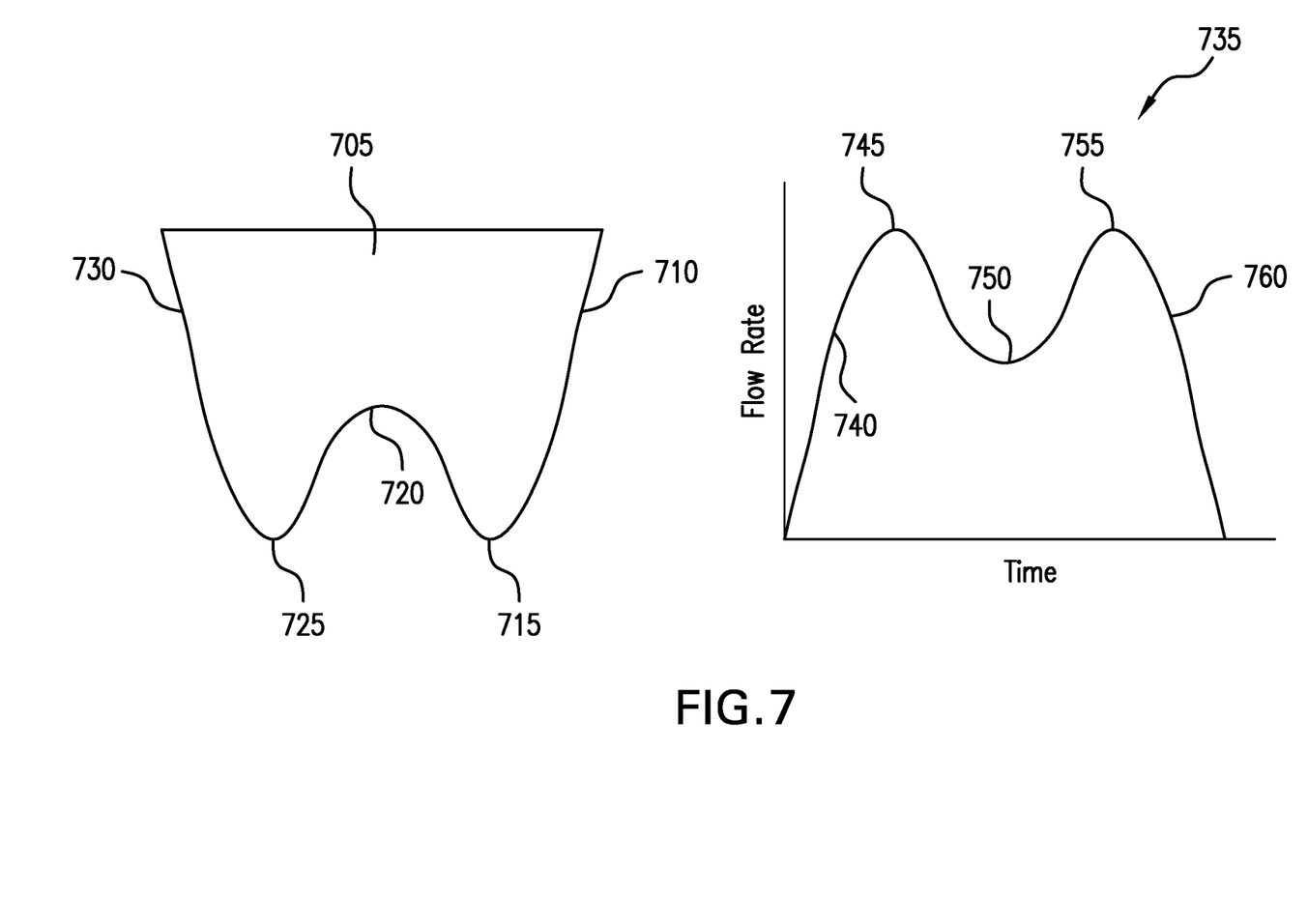
FIG. 7 depicts an irregular shaped target part and a corresponding exemplary flow rate vs. time graph.

FIG. 7 depicts an irregular shaped target part and a corresponding exemplary flow rate vs. time graph. A target part 705 includes a first edge 710. The first edge 710 connects to a first curved convex edge 715. The first curved convex edge 715 connects to a second curved convex edge 725 via a first curved concave edge 720. The second curved convex edge 725 connects to a second edge 730.

The graph 735 illustrates the increases and decreases in the flow rate as the target part 705 passes through a spray zone. The increase in the flow rate at 740 represents the first edge 710 entering the spray zone. As the first curved convex edge 715 enters the spray the zone, the graph 735 illustrates a first curvature in the flow rate, at 745, to correspond to the first curved convex edge 715. At 750, the graph 735 illustrates a second curvature in the flow rate that corresponds to the first curved concave edge 720. The graph 735 illustrates a third curvature in the flow rate to correspond to the second curved convex edge 725. Lastly, the graph 735 illustrates a decrease in the flow rate that corresponds to the second edge 730.

Figure 8:
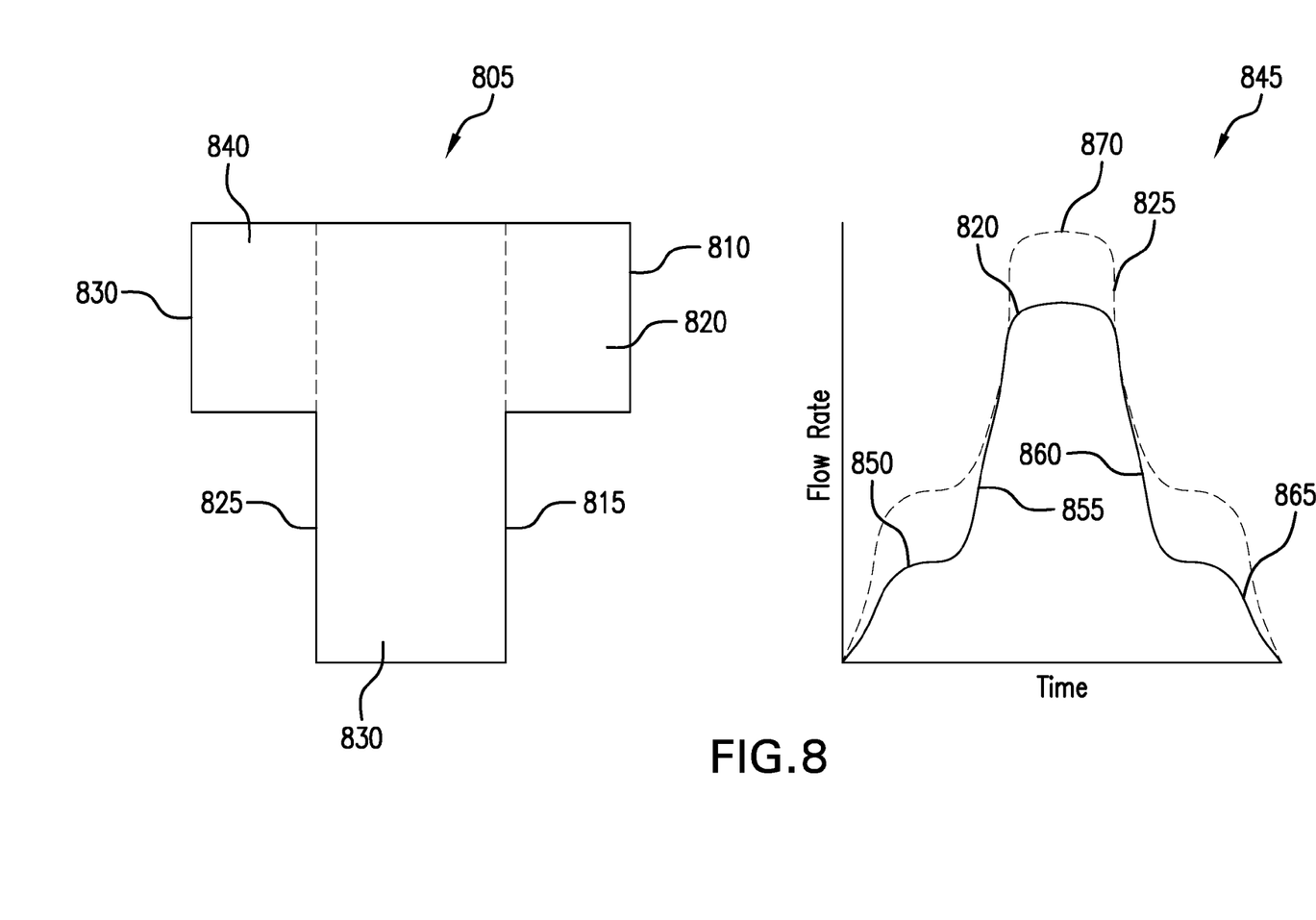
FIG. 8 depicts a T-shaped target part and a corresponding exemplary flow rate vs. time graph.

FIG. 8 depicts a T-shaped target part and a corresponding exemplary flow rate vs. time graph. The target part 805 includes a first edge 810. The first edge 810 and a second edge 815 define a first section 820 of the target part 805 between the first edge 810 and the second edge 815. The second edge 815 and a third edge 825 define a second section 830 of the target part between the second edge 815 and the third edge 825. The third edge 825 and a fourth edge 835 define a third section 840 of the target part between the third edge 825 and the fourth edge 835.

The graph 845 illustrates the increases and decreases in the flow rate as the target part 805 passes through a spray zone. As the first edge 810 enters the spray zone, the flow rate increases 850. The flow rate then remains constant until the second edge 815 enters the spray zone prompting a second increase 855 in the flow rate. The flow rate will again remain constant until the third edge 825 enters the spray zone prompting a first decrease 860 in the flow rate. The flow rate will remain constant after the first decrease 860 until the fourth edge 835 enters the spray zone prompting a second decrease 865 in the flow rate.

The second flow rate 870, depicted by the dotted line, for the target part 805 as the part passes through a spray zone illustrates a flow rate 870 that is proportionally higher than the first flow rate due to a decrease in humidity. For example, in low humidity conditions, a greater amount of powder may be needed to coat the target part 805. The shape of the target part 805 remains the same but an increase in the flow rate 870 is necessary for proper application under low humidity conditions.

Figure 9:
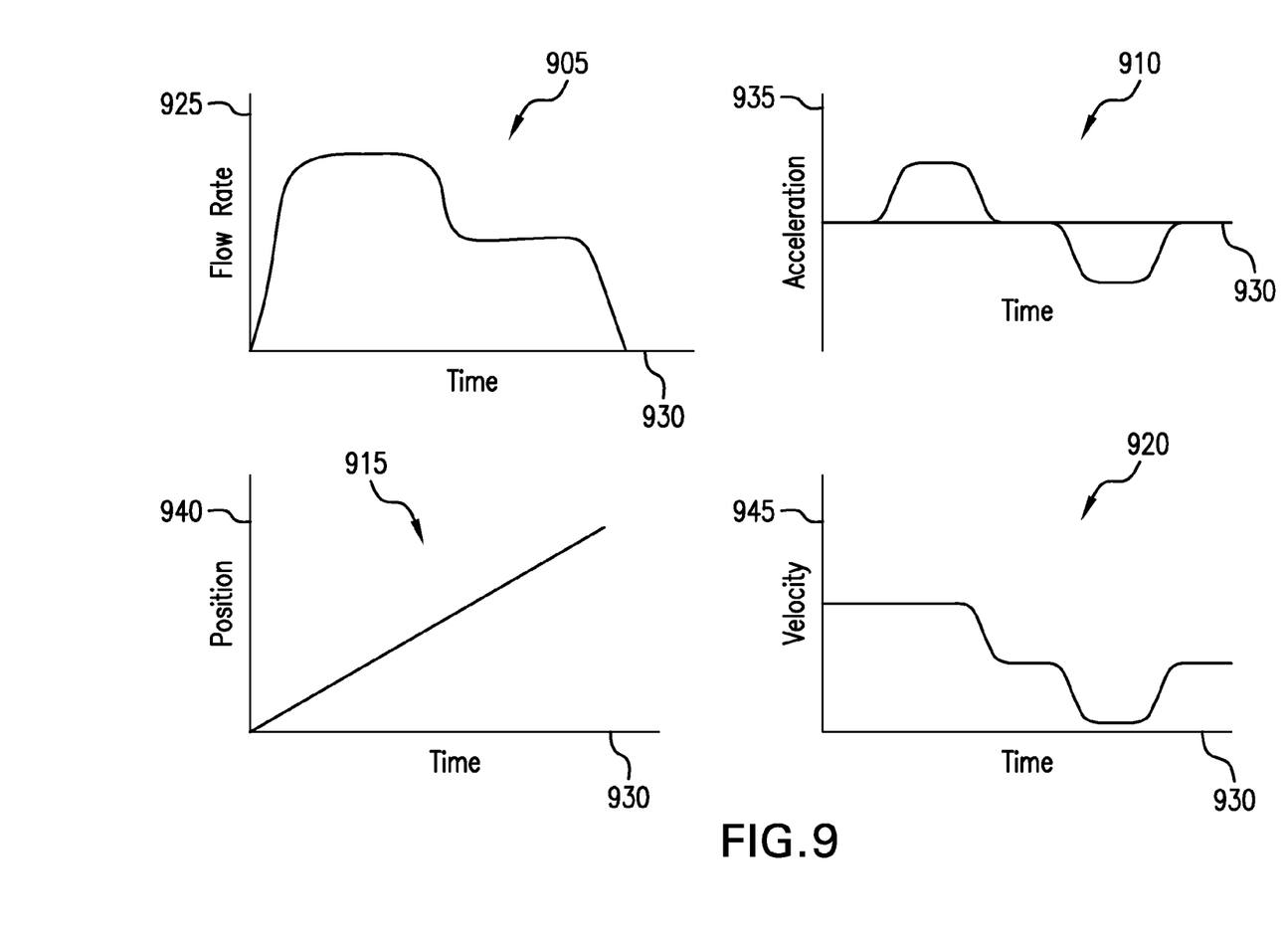
FIG. 9 depicts a representative depiction of various factors included in an exemplary nozzle temporal profile.

FIG. 9 depicts a representative depiction of various factors included in an exemplary nozzle temporal profile. As depicted, graphs 905, 910, 915, 920 represents different functions incorporated into a nozzle temporal profile for a target part. The graphs 905, 910, 915, 920 represent characteristics of different factors as the target part travels through a spray zone. The graphs 905, 910, 915, 920 all share the same time period 930. The graphs 905, 910, 915, 920 are generated by the PDMS 200 based on information received by the PDMS 200.

The graph 905 illustrates a flow rate 925 as a function of time 930 for the target part. The graph 905 may be used to generate a powder dispersing command and a nozzle motion trajectory command. The graph 935 represent an acceleration 935 as a function of time 930 for the target part. As depicted, the acceleration 935 increases and decreases at the target part travels through the spray zone. The graph 915 illustrates the position 940 of a conveyor belt as a function of time 910. In some embodiments, the position 940 of the target part may be incorporated into the nozzle temporal profile. The graph 920 illustrates the velocity 945 as a function of time 910. As depicted, the graph 920 illustrates increases and decreases in the velocity 945 as the target part travels through the spray zone.

As depicted, the nozzle temporal profile incorporates the graphs 905, 910, 915, 920. Each graph 905, 910, 915, 920 may represent a command to a corresponding component of the powder-coating system. For example, the nozzle temporal profile may include a command to increases and decrease the velocity of a conveyor based on the acceleration 935 as a function of time 930. The nozzle temporal profile may be transmitted to various controller systems of the powder-coating system. For example, the nozzle temporal profile may be transmitted to a conveyor speed controller to increase and decrease the conveyor speed in accordance with the flow rate 925 and position 940 of the conveyor as a target part travels through the spray zone.

Although various embodiments have been described with reference to the Figures, various embodiments are possible. For example, the nozzle temporal profile may include different factors, such as, for example, adjustment factors based on the composition of a target part. For example, the target part may be a piece of wood requiring a decrease of the conveyor speed as the target part travels through the spray zone to increase the effectiveness of the powder-coating system. In another example, the target part may be a piece of metal requiring an increase in the conveyor speed. In some embodiments, a sensor may provide the information to the PDMS 200 for generating a graph to be incorporated into the nozzle temporal profile. In various embodiments, an operator may provide the information to the PDMS 200.

In various embodiments, the PDMS may receive real-time information about the size and shape of the a part from an input source. The input source may be a manual entry from an operator, or more efficiently, sensors that can scan a part as the part travels along on a conveyor. The PDMS may receive the size and shape information about the pre-heated wooden part to vary the powder flow rate along the conveyor as the part travels through it. For example, the length of the part can be input to the controller to vary the dispersing powder flow rate. The dispersing of a powder via a dispersing powder flow rate flow rate may achieve a predetermined thickness of powder applied to the part. In some embodiments, the PDMS may permit dynamic coating of parts of varying sizes, without the need of human interference, based on received information about the size of a part from shape sensor, for example. The PDMS may prevent too much or too little coating of the parts to avoid imperfections, such as, for example, blistering because of too much powder on the edges. The PDMS may provide a consistent powder flow to cover the part. In some embodiments, The PDMS may reduce excess waste of powder via the dispersing powder commands to control flow rate. The PDMS may advantageously provide for a part to be coated in single pass. In some embodiments, the PDMS can vary the speed of the conveyor based on information received information from either a sensor or operator input module. In various embodiments, the PDMS may receive information from both a sensor and an operator. In some embodiments, the PDMS may receive information about climate conditions, such as, for example, humidity. The PDMS may generate adjustment factors, based on a received humidity measurement, to modify a nozzle temporal profile. For example, a nozzle temporal profile may be modified to vary the conveyor speed.

In some embodiments, a centralized database may be accessed by a local powder-coating system. The centralized database may transmit to the local powder-coating system a nozzle temporal profile for a target part based on historical information.

In some embodiments, the processor may be a single core processor or multi-core processor. Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the PDMS may communicate using suitable communication methods, equipment, and techniques. For example, the PDMS may communicate with compatible devices (e.g., devices capable of transferring data to and/or from the PDMS) using point-to-point communication in which a message is transported directly from the source to the receiver over a dedicated physical link (e.g., fiber optic link, point-to-point wiring, daisy-chain). The components of the PDMS may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A powder dispersing management system comprising:
a controller;
a sensor interface operably coupled to the controller and configured to receive shape information measured by a sensor as a target object is being conveyed along a path of travel of a conveyor, the shape information defining a shape profile of the target object in a dimension orthogonal to the conveyor path of travel;
a dispersing command output interface operably coupled to the controller and adapted to convey a powder dispersing command to a powder flow controller that supplies powder to a reciprocating nozzle;
a nozzle motion trajectory command interface operably coupled to the controller and adapted to convey nozzle motion trajectory commands to a position controller for the reciprocating nozzle;
a non-volatile memory operably coupled to the controller and containing a program of instructions that, when executed by the controller, cause the controller to perform operations to dispense a predetermined amount of powder in response to the shape information of the target object, the operations comprising:
dynamically generate a nozzle temporal profile comprising a coordinated set of nozzle motion trajectory commands and powder dispersing commands based on the received shape information;
transmit the powder dispersing commands to the powder flow controller via the dispersing command output interface; and,
transmit the nozzle temporal profile to the position controller via the nozzle motion trajectory command interface;
wherein the nozzle temporal profile is generated such that a predetermined amount of powder is dynamically supplied to the target object based on the shape of a portion of the target object as it passes by the nozzle.

2. The apparatus of claim 1, wherein the target object is a wood part.

3. The apparatus of claim 1, wherein the target object is a metal part.

4. The apparatus of claim 1, wherein the sensor is a photoelectric light screen.

5. The apparatus of claim 1, wherein the sensor is a laser break-beam sensor.

6. The apparatus of claim 1, further comprising the sensor interface operably connected to a hygrometer and configured to receive humidity measurements from the hygrometer, wherein the sensor interface transmits the humidity measurements to the controller.

7. The apparatus of claim 6, the operations further comprising generate an adjustment humidity variable based on the received humidity measurements.

8. The apparatus of claim 7, the operations further comprising generate a nozzle temporal profile comprising a coordinated set of nozzle motion trajectory commands and powder dispersing commands, based on the received shape information, and adjusted to account for the adjustment humidity variable.

9. The apparatus of claim 1, further comprising a network interface card configured to communicate with a remote database.

10. The apparatus of claim 9, wherein the remote database stores the received shape information.

11. A powder dispersing management system comprising:
a controller;
a sensor interface operably coupled to the controller and configured to receive shape information measured by a sensor as a target object is being conveyed along a path of travel of a conveyor, the shape information defining a shape profile of the target object in a dimension orthogonal to the conveyor path of travel;
a dispersing command output interface operably coupled to the controller and adapted to convey a powder dispersing command to a powder flow controller that supplies powder to a reciprocating nozzle;
a nozzle motion trajectory command interface operably coupled to the controller and adapted to convey nozzle motion trajectory commands to a position controller for the reciprocating nozzle;
a non-volatile memory operably coupled to the controller and containing a program of instructions that, when executed by the controller, cause the controller to perform operations to dispense a predetermined amount of powder in response to the shape information of the target object, the operations comprising:
generating a nozzle temporal profile comprising a coordinated set of nozzle motion trajectory commands and powder dispersing commands based on the received shape information;
transmitting the powder dispersing commands to the powder flow controller via the dispersing command output interface; and,
transmitting the nozzle temporal profile to the position controller via the nozzle motion trajectory command interface;
wherein the nozzle temporal profile is generated such that a predetermined amount of powder is dynamically supplied to the target object based on the shape of a portion of the target object as it passes by the nozzle.

12. The apparatus of claim 11, wherein the target object is a wood part.

13. The apparatus of claim 11, wherein the target object is a metal part.

14. The apparatus of claim 11, wherein the sensor is a photoelectric light screen.

15. The apparatus of claim 11, wherein the sensor is a laser break-beam sensor.

16. The apparatus of claim 11, further comprising the sensor interface operably connected to a hygrometer and configured to receive humidity measurements from the hygrometer, wherein the sensor interface transmits the humidity measurements to the controller.

17. A powder dispersing management system comprising:
a controller;
a sensor interface operably coupled to the controller and configured to receive shape information measured by a sensor as a target object is being conveyed along a path of travel of a conveyor, the shape information defining a shape profile of the target object in a dimension orthogonal to the conveyor path of travel;
a dispersing command output interface operably coupled to the controller and adapted to convey a powder dispersing command to a powder flow controller that supplies powder to a reciprocating nozzle;
a non-volatile memory operably coupled to the controller and containing a program of instructions that, when executed by the controller, cause the controller to perform operations to dispense a predetermined amount of powder in response to the shape information of the target object, the operations comprising:

dynamically generate a nozzle temporal profile comprising the powder dispersing commands based on the received shape information;

transmit the powder dispersing commands to the powder flow controller via the dispersing command output interface; and, wherein the nozzle temporal profile is generated such that a predetermined amount of powder is dynamically supplied to the target object based on the shape of a portion of the target object as it passes by the nozzle.

18. The apparatus of claim 17, further comprising a nozzle motion trajectory command interface operably coupled to the controller and adapted to convey nozzle motion trajectory commands to a position controller for the reciprocating nozzle.

19. The apparatus of claim 18, the operations further comprising transmit the nozzle temporal profile to the position controller via the nozzle motion trajectory command interface.

20. The apparatus of claim 17, wherein the target object is a wood part.

* * * * *